United States Patent
Altunata et al.

(10) Patent No.: US 12,045,882 B1
(45) Date of Patent: Jul. 23, 2024

(54) SYSTEMS AND METHODS FOR PREDICTING A CLUSTER OF A SIDE OF ORDER BOOK MARKET LIQUIDITY

(71) Applicant: Wells Fargo Bank, N.A., San Francisco, CA (US)

(72) Inventors: Serhan Altunata, Jersey City, NJ (US); Vanio Markov, Ridgewood, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 36 days.

(21) Appl. No.: 17/651,258

(22) Filed: Feb. 16, 2022

Related U.S. Application Data (60) Provisional application No. 63/149,990, filed on Feb. 16, 2021.

(51) Int. Cl.
| | | |
|---|---|---|
| *G06Q 40/00* | (2023.01) | |
| *G06N 7/01* | (2023.01) | |
| *G06N 10/00* | (2022.01) | |
| *G06Q 40/04* | (2012.01) | |

(52) U.S. Cl.
CPC .............. *G06Q 40/04* (2013.01); *G06N 7/01* (2023.01); *G06N 10/00* (2019.01)

(58) Field of Classification Search
CPC ........ G06Q 40/00; G06Q 40/04; G06N 10/00; G06N 7/01
See application file for complete search history.

(56) References Cited

U.S. PATENT DOCUMENTS

| | | | | |
|---|---|---|---|---|
| 2007/0294162 | A1* | 12/2007 | Borkovec | G06Q 40/04 705/37 |
| 2019/0244288 | A1* | 8/2019 | Singh | G06Q 40/04 |

FOREIGN PATENT DOCUMENTS

| | | | | |
|---|---|---|---|---|
| KR | 2022042103 | A * | 4/2022 | G06F 40/35 |

OTHER PUBLICATIONS

Simulating and analyzing order book data: The queue-reactive model W Huang, CA Lehalle ... —Journal of the American ... , 2015—Taylor & Francis (Year: 2015).*
Cont et al., "The price impact of order book events", Mar. 2011.
Orrell, D., Introduction to the mathematics of quantum economics, Jan. 2, 2020.
Li, JA., Dong, D., Wei, Z et al., Quantum reinforcement learning during human decision-making. Nat Hum Behav 4, 294-307 (2020).

* cited by examiner

*Primary Examiner* — Lalita M Hamilton
(74) *Attorney, Agent, or Firm* — K&L Gates LLP (57) ABSTRACT

Systems, apparatuses, methods, and computer program products are disclosed for predicting or determining the side of an order book that market liquidity will cluster at a future time period to facilitate optimization of spread capture. The method may include receiving market tick data. The method may include receiving an order book. The method may include in response to reception of the market tick data generating a probability or outcome indicating which side of the order book will cluster, determining an execution strategy based on the probability or outcome, and performing the execution strategy in relation to the order book.

20 Claims, 8 Drawing Sheets

SYSTEMS AND METHODS FOR PREDICTING A CLUSTER OF A SIDE OF ORDER BOOK MARKET LIQUIDITY

CROSS-REFERENCE TO RELATED APPLICATIONS

This application claims the benefit of U.S. Provisional Patent Application No. 63/149,990, filed Feb. 16, 2021, the entire contents of which are incorporated herein by reference.

TECHNOLOGICAL FIELD

Example embodiments of the present disclosure relate generally to predicting a cluster of a side of order book market liquidity and, more particularly, to systems and methods to predict which side of order book market liquidity will cluster at a future time period and to determine an order or execution strategy based on such a prediction.

BACKGROUND

An order book may describe a collection of all open orders for financial instruments or stocks. Such a collection may include an open buy side order (e.g., a request to buy stock at a particular price and at a particular time) and an open sell side order (e.g., an offer to sell stock at a particular price and at a particular time). Large volumes of trading decisions (e.g., on the order of millions) may occur over the space of seconds. In other words, an order book may include all of the open buy orders and all of the open sell orders for a particular financial instrument or stock at a particular time period, with the number of orders in the order book continuously updating based on fulfillment and/or cancelation of orders. Further, matching buy orders to sell orders to may not result in the most efficient transactions (e.g., matching high value buy orders with low value sell orders).

BRIEF SUMMARY

Accordingly, Applicant has recognized a need for systems and methods to predict which side of an order book that market liquidity may be clustered to reduce uncertainty in selection of an execution price and create an optimal quoting or executing strategy for spread capture during execution of trades. Such systems and methods may utilize a classifier to indicate which side of the order book is likely to cluster in a forward time window. The classifier may be the output of a blended or stacked model. The blended or stacked model may utilize machine learning based on classical computing and/or quantum computing (e.g., via quantum circuitry). By predicting the clustering of an order book for a given forward time window, an organization may more effectively design its order execution processes.

Systems, apparatuses, methods, and computer program products are disclosed herein for predicting the side of an order book on which market liquidity is clustering to create an optimal quoting or execution strategy. Such systems and method may reduce uncertainty in order or execution price. For example, a favorable indicator or classifier may result in a spread capture execution tactic which may start with a passive/midpoint quoting combination cycle or an unfavorable indicator or classifier may result in a skip to a spread crossing/take cycle.

In one example embodiment, a method is provided for determining which side of order book market liquidity will cluster at a future time period. The method may include receiving, by an order book circuitry, market tick data. The method may include building, by the order book circuitry, an order book including open buy side orders and open sell side orders. The method may include, once the market tick data has been received or in response to reception of market tick data by the order circuitry, generating, by the order book circuitry and a trained model, a probability or outcome indicating whether the open buy side orders or the open sell side orders will cluster. The trained model may be trained using at least in part a quantum circuit with historical execution and market tick data. The method may include determining, by the order book circuitry, an execution strategy based on the probability or outcome. The method may also include performing, by the order book circuitry, the execution strategy in relation to the open buy side orders or the open sell side orders.

In another embodiment, the order book circuitry may use or utilize a combination of a classical computer and a quantum computer to generate the probability or outcome by the trained model. The method may also include receiving, by the order book circuitry, a time series database or data. The method may include generating, by the order book circuitry and at least in part using a quantum circuit, a probability of directionality of price movement in a future time horizon based on the order book and the time series database or data.

In an embodiment, the trained model may be trained using one or more of a quantum computer or a classical computer. The trained model may be or comprise one of a Quantum Bayesian, recurrent neural network (RNN), extreme gradient boosted trees, or a combination thereof.

In another embodiment, the method may include receiving a frequency of calculation to generate a classification. The method may include determining, at least in part using a quantum circuit and based on the historical execution and market tick data, a classification for the future time period identifying which side of the order book is likely to cluster. Determining the classification may occur based on the frequency of classification. The trained model is trained to predict the probability of directionality of price movement in the future time horizon using multi-class classification. The frequency of calculation may occur once every less than or equal to 1 second.

In another embodiment, the market tick data may be received substantially continuously, and the probability or outcome and execution strategy are generated and determined, respectively, substantially simultaneously. The probability or outcome and execution strategy may be generated and determined, respectively, about once each millisecond to about once each second.

In another embodiment, a plurality of probabilities or outcomes may be generated based on substantially continuously updated market tick data. The execution strategy may be based on the plurality of probabilities or outcomes generated over a selected period of time In another example embodiment, an apparatus is provided for predicting a probability or outcome of directionality of price movement in a future time horizon. The apparatus may include an order book circuitry. The order book circuitry may be configured to receive market tick data. The order book circuitry may be configured to build an order book including open buy side orders and open sell side orders. In response to reception of market tick data, the order book circuitry may be configured to generate, using a trained model, a probability or outcome indicating whether the open buy side orders or the open sell side orders will cluster. The trained model being trained may use, at least in part, a quantum circuit with historical execution and market tick data. The order book circuitry may determine an execution strategy based on the probability or outcome. Performance of the execution strategy in relation to the open buy side orders or the open sell side orders In an embodiment, the order book may include historical buy side orders and open sell side orders. The order book circuitry may be configured to update the order book substantially continuously updated over time based on new open buy side orders and new open sell side orders. The probability or outcome may be based on a determined intersection between a demand curve and a supply curve.

In another example embodiment, a computer program product is provided for predicting a probability or outcome of directionality of price movement in a future time horizon, the computer program product comprising at least one non-transitory computer-readable storage medium storing software instructions that, when executed. The computer program product, when executed, may receive market tick data. The computer program product may build an order book including open buy side orders and open sell side orders. The computer program product may, in response to reception of market tick data, generate, using a trained model of the computing device, a probability or outcome indicating whether the open buy side orders or the open sell side orders will cluster, the trained model being trained using at least in part a quantum circuit with historical execution and market tick data. The computer program product may determine an execution strategy based on the probability or outcome. The computer program product may perform the execution strategy in relation to the open buy side orders or the open sell side orders.

In another example embodiment, a method is provided for predicting a cluster of a side of order book market liquidity at a future time period. The method may include receiving historical execution and market tick data. The method may include receiving an order book. The method may include receiving a frequency of calculation to generate a classification. The method may include determining, at least in part using a quantum circuit and based on the historical execution and market tick data, a classification for the future time period identifying which side of the order book is likely to cluster for use in determining which side of the book order is likely to cluster.

In another example embodiment, a method is provided for predicting a probability or outcome of directionality of price movement in a future time horizon. The method may include receiving an order book. The method may include receiving a time series database or data. The method may include training, using at least in part a quantum circuit and based on data from the time series database or data, a recurrent neural network model to predict the probability or outcome of directionality of price movement in the future time horizon.

The foregoing brief summary is provided merely for purposes of summarizing example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

DETAILED DESCRIPTION

Some embodiments of the present disclosure will now be described more fully hereinafter with reference to the accompanying figures, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, servers, virtual computing device or environment, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory may store or include instructions executable by the processor.

As used herein, a "processor" or "processing circuitry" may include, for example one processor or multiple processors included in a single device or distributed across multiple computing devices. The processor (e.g., processor 202 shown in FIG. 2) may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

The terms "classical computing", "classical computer", "classical computing device", and "classical computing system" are used to refer to a binary computing device or device. A classical computer may execute functions or operations in a deterministic and logical way.

The terms "quantum computing", "quantum computer", "quantum computing device", "quantum computing system", and "quantum annealer" are used to refer to a computing device or device utilizing quantum bits (which may also be referred to as qubits).

The terms "quantum bit" and "qubit" both refer to a basic unit of quantum information comprising a two-state, or two-level, quantum mechanical system, such as: the polarization of a single photon (e.g., a photon encoded using a quantum basis as previously defined); the spin of a single electron (e.g., a spin qubit comprising the spin up state $|1\rangle$ and the spin down state $|0\rangle$); the energy level of a single atom (e.g., a superconducting qubit); or any other suitable qubit. A quantum bit may exhibit quantum superposition of multiple states, unlike a classical bit, which is either a 0 or a 1. The superposition of a qubit's states is a feature of quantum mechanics, and enables certain calculations to be performed probabilistically in parallel and at a faster rate by a quantum computer than is possible by a classical computer.

Overview

As noted above, methods, apparatuses, systems, and computer program products are described herein for predicting the side of order book on which market liquidity will cluster at a future time period. Traditionally, it has been very difficult to train such models based on constantly changing and multi-faceted data. It is also difficult to identify price movement deep in the limit order book. In addition, training such a model using typical classical computing, e.g., a computing device, may take a significant amount of time and a significant amount of data to ensure lower error rates, factors that have historically prevented the real-time utilization of classical computing in this setting.

In contrast to these conventional techniques for identifying price movement, the present disclosure describes new systems and methods for predicting the side of an order book on which market liquidity will cluster. Such systems and methods may include different inputs to produce such a prediction, probability, classifier, classification, outcome, trigger, and/or indication. The inputs for the systems and methods may include an order book, order books, order books for a particular financial instrument, order books for one or more financial instruments, a time-series database (e.g., details regarding transactions related to one or more financial instruments over a selected series, period, or interval of time), market tick data (e.g., upwards, downwards, and/or no change related to the one or more financial instruments), and/or some a combination therein. Such data may be input into a classical computer and/or quantum computer. Data passed to the classical computer may be modeled or classified utilizing a supervised or unsupervised machine learning algorithm, such as a neural network, support vector machine, linear regression, decision trees, Naive Bayes, Nearest Neighbor, and/or some combination therein. During training via the machine learning algorithm, the same data may be sent to quantum computer. The quantum computer may train a model to produce a trained model or classification/classifier significantly faster and more efficiently, e.g., utilizing similar algorithms noted above, e.g., Bayesian networks, recurrent neural network, extreme gradient boosted trees, an average blender of the aforementioned approaches, and/or some combination thereof. Once a classification/classifier or model is trained, another computing device (e.g., another or the same classical computer and/or quantum computer) may utilize the classifier or trained model to determine order or execution strategies and/or to determine a probability, outcome, or other determination indicating which side of an order book will cluster, such a probability or outcome (e.g., or other determination or indicator) utilized to determine an order or execution strategy. In such examples, the classifier or model may receive, as an input, an order book, and in some examples other parameters, and output a binary or multi-class classification indicating which side of an order book will cluster and/or a probability of the directionality of movement of the mid-price (e.g., up, down, unchanged, etc.).

Accordingly, the present disclosure sets forth systems, methods, and apparatuses that determine an order or execution strategy in a shorter than typical amount of time and with high accuracy. There are many advantages of these and other embodiments described herein. For instance, using quantum compute significantly reduces the amount of time and data required to train a particular classifier or model. The use of a hybrid approach offers the benefits of quantum computing but with a classical computing device providing a lower cost second source of authority. Using such a model allows for many valuations to occur in a short amount of time. The use of quantum computing ensures a low error rate, particularly at lower sample rates. Finally, the output of such a system may ensure that a reliable execution strategy is formed based on large data sets in the short periods of time available for operationalizing the resulting information during order execution.

Although a high level explanation of the operations of example embodiments has been provided above, specific details regarding the configuration of such example embodiments are provided below.

System Architecture

Figure 1:
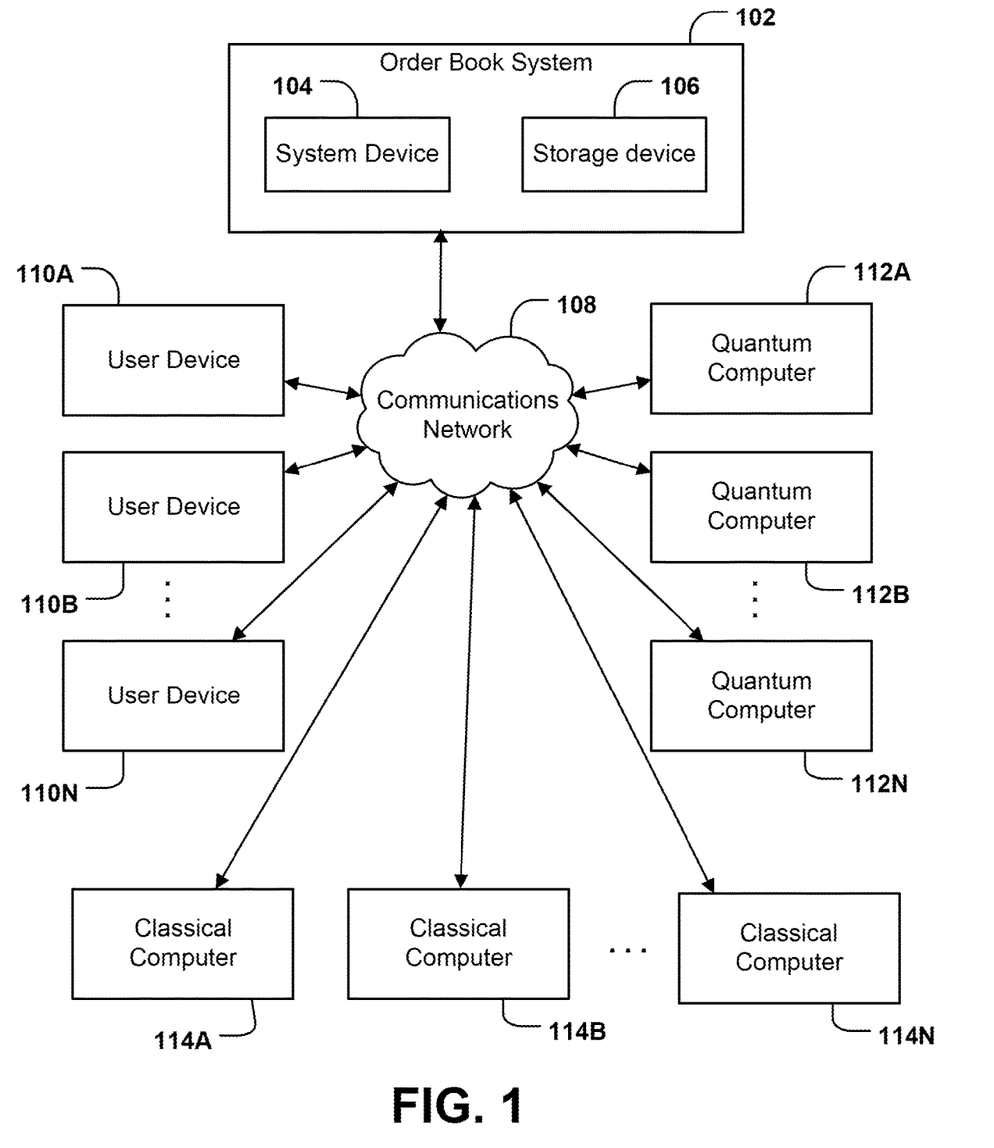
FIG. 1 illustrates a system in which some example embodiments may be used.

Example embodiments described herein may be implemented using any of a variety of computing devices or servers. To this end, FIG. 1 illustrates an example environment within which embodiments of the present disclosure may operate. As illustrated, an order book system 102 may include a system device 104 in communication with a storage device 106. Although system device 104 and storage device 106 are described in singular form, some embodiments may utilize more than one system device 104 and/or more than one storage device 106. Additionally, some embodiments of the order book system 102 may not require a storage device 106 at all. Whatever the implementation, the order book system 102, and its constituent system device(s) 104 and/or storage device(s) 106 may receive and/or transmit information via communications network 108 (e.g., the Internet) with any number of other devices, such as one or more of user device 110A, user device 110B, through user device 110N, quantum computer 112A, quantum computer 112B, through quantum computer 112N, classical computer 114A, classical computer 114B, and/or through classical computer 114N.

System device 104 may be implemented as one or more servers, which may or may not be physically proximate to other components of order book system 102. Furthermore, some components of system device 104 may be physically proximate to the other components of order book system 102 while other components are not. System device 104 may receive, process, generate, and transmit data, signals, and electronic information to facilitate the operations of the order book system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). The storage device 106 may comprise one or more different components to store different data or data points to be utilized by the system device 104. Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the order book system 102. Storage device 106 may store information relied upon during operation of the order book system 102, such as an order book, a time-series database including data related to one or more order books, historical execution and market tick data, parameters for a particular order book execution strategy (e.g., frequency of calculation or determination or other parameters), a number of qubits for the classification, a trained model or classifier, and/or other data or information that may be used by the order book system 102, data and documents to be analyzed using the order book system 102, or the like. In addition, storage device 106 may store control signals, device characteristics, and access credentials enabling interaction between the order book system 102 and one or more of the user devices 110A-110N, quantum computers 112A-112N, or classical computers 114A-114N.

The one or more user devices 110A-110N and/or the one or more classical computers 114A-114N may be embodied by any computing devices known in the art, such as desktop or laptop computers, tablet devices, smartphones, or the like. Finally, the one or more quantum computers 112A-112N may be embodied by any quantum computing device known in the art. One or more of the one or more quantum computers 112A-112N may be embodied by a quantum annealer. The one or more user devices 110A-110N, the one or more quantum computers 112A-112N, and the one or more classical computers 114A-114N need not themselves be independent devices, but may be peripheral devices communicatively coupled to other computing devices.

Although FIG. 1 illustrates an environment and implementation of the present disclosure in which the order book system 102 interacts with one or more of user devices 110A-110N, quantum computers 112A-112N, or classical computers 114A-114N. In some embodiments one or more of the users or agents may directly interact with the order book system 102 (e.g., via input/output circuitry of system device 104), in which case a separate device may not need to be utilized for such users or agents. Whether by way of direct interaction or interaction via a separate device, users and agents may communicate with, operate, control, modify, or otherwise interact with the order book system 102 to perform functions described herein and/or achieve benefits as set forth in connection with this disclosure.

Example Implementing Apparatuses

Figure 2:
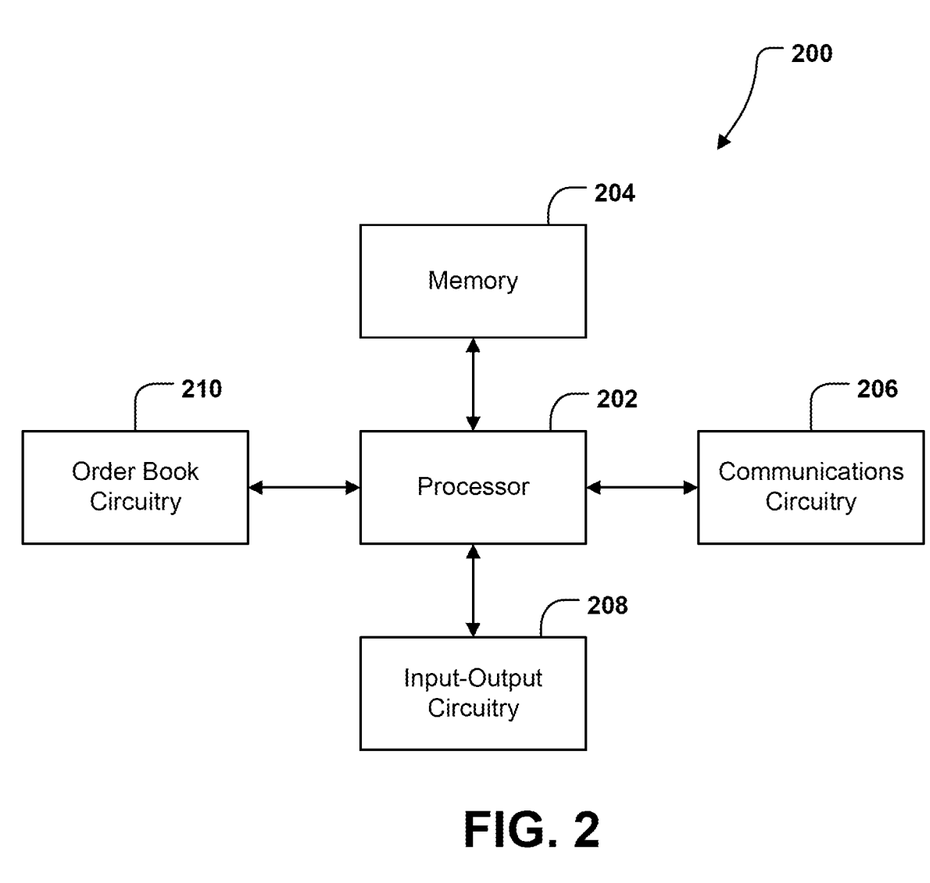
FIG. 2 illustrates a schematic block diagram of example circuitry embodying a device that may perform various operations in accordance with some example embodiments described herein.

System device 104 of the order book system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, and order book circuitry 210, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described herein, such as those described above in connection with FIG. 1 and below in connection with FIGS. 3-7.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor 202 may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input and/or receive data. It will be noted that some embodiments will not include input-output circuitry 208, in which case user input (e.g., securities or stock requests) may be received via a separate device such as user devices 110A-110N, quantum computers 112A-112N, and/or classical computers 114A-114N. The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, an image capture device, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises the order book circuitry 210 that, in response to reception of market tick data or current market tick data and/or other data or information, estimates and/or determines a probability or outcome indicating which side of an order book will cluster and/or a probability or outcome indicating the directionality of movement of the mid-price (e.g., up, down, unchanged, etc.). The order book circuitry 210 or other circuitry or computing device may train the model or classifier utilized to determine such probabilities or outcomes based on large sets of historical market tick data and/or order books, among other data. The order book circuitry 210 may utilize processor 202, memory 204, or any other hardware component included in the apparatus 200 to perform these operations, among other operations, as described in connection with FIGS. 3-8 below. The order book circuitry 210 may further utilize communications circuitry 206 to gather data from a variety of sources (e.g., user devices 110A-110N, as shown in FIG. 1, or other devices), may utilize input-output circuitry 208 to receive data from a user or data source (e.g., storage device 106 or memory 204), and in some embodiments may utilize processor 202 and/or memory 204 to receive an order book and market tick data (e.g., historical or current) and/or perform the training, determinations, and/or predictions regarding execution strategies, as well as executing the determined execution strategies. The output of the order book circuitry 210 may be transmitted to other circuitry of the apparatus 200 (e.g., communications circuitry 206 and/or input-output circuitry 208). In an embodiment, the order book circuitry 210, may receive an order book, a time-series database including data related to one or more order books or historical order books, the particular financial instrument for each received order book, historical execution and market tick data, parameters for a particular order book execution strategy (e.g., frequency of calculation or determination or other parameters), a number of qubits for the classification, and/or a trained model or classifier, among other data. As noted the order book circuitry 210 may receive one or more different parameters associated with training and/or operations of models or classifiers generated by and/or included in the order book circuitry 210. The order book circuitry 210, as noted, may train and/or include one or more models or classifiers (e.g., each model or classifier being a quantum computer and/or classical computer based model or classifier).

For example, the order book circuitry 210 may include a trained model or classifier or, in particular, an order book side cluster model or classifier and/or a multi-classification order book model or classifier. The order book side cluster model or classifier may receive as inputs (a) an order book (b) the frequency to calculate or generate an output, and (c) prior execution and market tick data including or excluding currently updated execution and market tick data, among other inputs. The order book may be structured such that each line of data includes (a) a bid price including an exchange list and exchange size list and (b) an offer price including an exchange list and exchange size list. The order book side cluster model or classifier may output a probability (e.g., a number or percentage), an outcome (e.g., an indicator or determination represented by numbers, text, and/or other symbols/characters), or binary classification (e.g., 0 or 1, yes or no, etc.) to indicate which side of the order book is likely to cluster. The multi-classification order book model or classifier may receive as inputs, (a) a time-series database, (b) an order book, and/or (c) production data (e.g., current orders in an order book, which may update many times over the course of a second or other specified or selected time frame). The multi-classification order book model or classifier may output a probability or outcome that may indicate directionality of the order book (e.g., up, down, unchanged, etc.). Each of the models may be either a machine learning model and/or statistical model. Each model or classifier may be generated by one or more of a quantum computer and/or classical computer. In another embodiment, either of the models may be executed on one or more of the quantum computer and/or classical computer. While the quantum computer offers faster and more accurate modeling or simulation (e.g., using one or more different simulation techniques) of different scenarios, the compute power of the quantum computer may not be required in every instance. Since the amount of market tick data is large over the course of, for example, 1 second or in some cases even less, a quantum computer may be utilized, at least for application of data to the trained model or classifier, while a classical computer may be utilized to train such a model or classifier. Based on an amount of data received, the order book circuitry 210 may be configured to determine whether to utilize a quantum computer and/or classical computer. Such a determination may further be based on availability of the quantum computer and/or classical computer and/or based on the parameters received. Further, the order book circuitry 210 may perform other functions, such as determining an execution or order strategy based on determined or generated probabilities or outcome and/or executing the execution or order strategy (e.g., determining execution price and quoting strategy for spread capture in execution algorithms).

Although components 202-210 are described in part using functional language, it will be understood that the particular implementations necessarily include the use of particular hardware. It should also be understood that certain of these components 202-210 may include similar or common hardware. For example, the order book circuitry 210 may at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the order book circuitry 210 may leverage processor 202, memory 204, communications circuitry 206, or input-output circuitry 208 as described above, it will be understood that any of these elements of apparatus 200 may include one or more dedicated processors, specially configured field programmable gate arrays (FPGA), or application specific interface circuits (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the order book circuitry 210 is implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments of the present disclosure are described below in connection with a series of graphical user interfaces and flowcharts.

Example Operations

Figure 3:
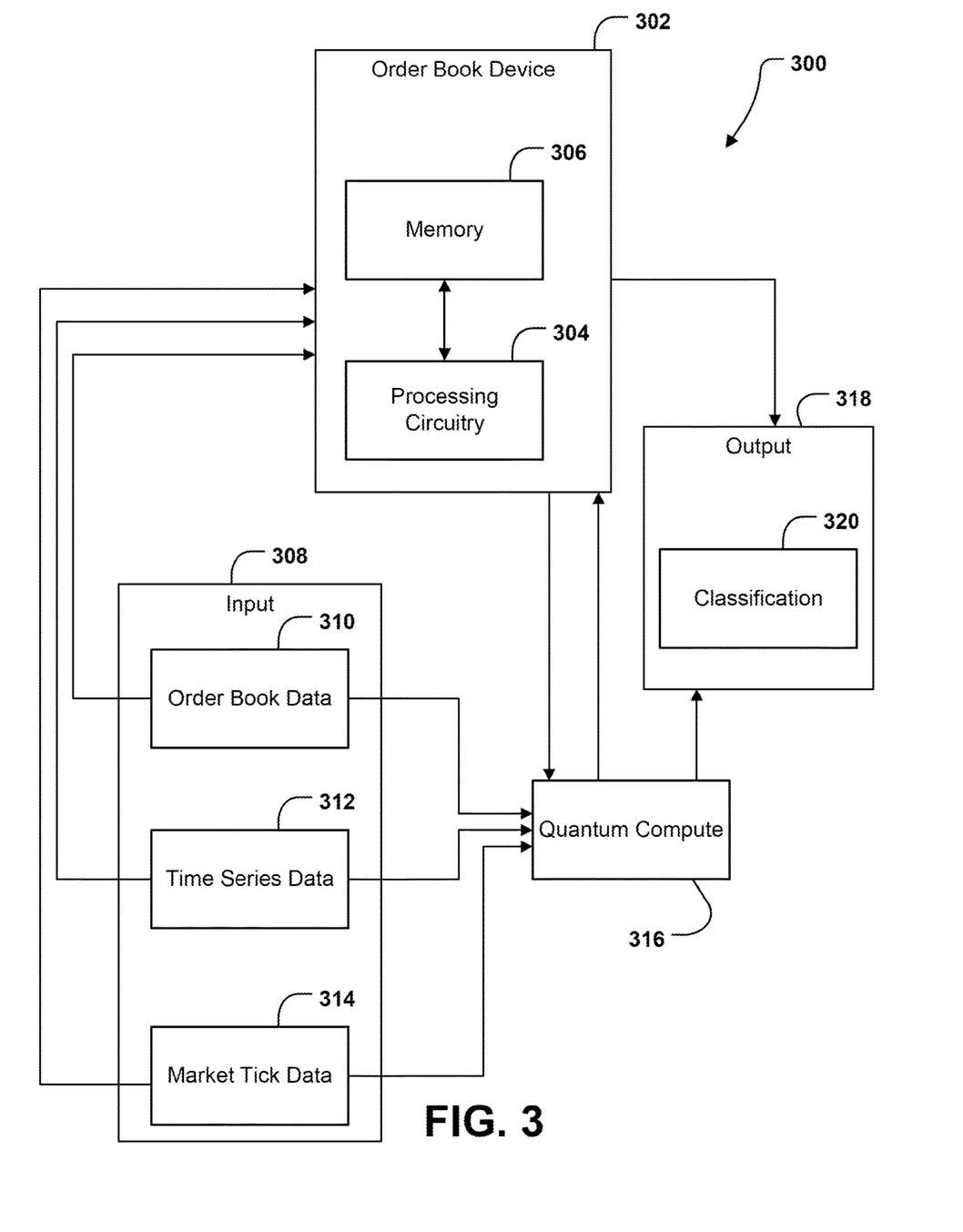
FIG. 3 illustrates a block diagram of an example computing device utilizing data to determine a value, in accordance with some example embodiments herein.

Example embodiments described herein may be implemented using any of a variety of computing devices, servers and/or quantum computers, e.g., such as order book system 102 and/or apparatus 200. To this end, FIG. 3 illustrates a block diagram of an example order book device 302 utilizing data to determine a classification within which embodiments of the present disclosure may operate. As illustrated, an order book system 300 may include an order book device 302. The order book device 302 may include a memory 306 and processing circuitry 304, the memory 306 in communication with the processing circuitry 304. The memory 306 may include data and instructions executable by the processing circuitry 304. The order book device 302 may be in communication with quantum compute 316. Quantum compute 316 may include various components to output or determine a classifier, indicator, probability, outcome, trigger, and/or likelihood, as will be described herein. Although the order book device 302 and quantum compute 316 are described in singular form, some embodiments may utilize more than one computing device for the order book device 302 and/or the quantum compute 316. Whatever the implementation, the order book device 302 and the quantum compute 316 may receive and/or transmit information (such as the input 308 and the output 318) via communications network (e.g., the Internet, an intranet, or via hardwire) with any number of other devices.

Order book device 302 may be implemented as one or more servers, which may or may not be physically proximate to other components of the order book system 300. Furthermore, some components of the order book device 302 may be physically proximate to the other components of order book system 300 while other components are not. Order book device 302 may receive, process, generate, and transmit data, signals, and electronic information to facilitate the operations of the order book system 300.

The input 308 or output 318 may comprise data stored on a computing device or storage device. Data associated with the input 308 or output 318 may be stored on a computing device or storage device. The storage device may comprise a distinct component from the order book device 302, or may comprise an element of order book device 302 (e.g., memory 306 or other storage devices). Storage devices may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network). Storage devices (e.g., memory 306)

may host the software, firmware, and/or instructions executed to operate the order book device 302. Storage devices may store information relied upon during operation of the order book device 302, such as inputs 308 that may be used by the order book device 302, data and documents to be analyzed using the order book device 302, or the like. In addition, storage devices may store control signals, device characteristics, and access credentials enabling interaction between the order book device 302, the quantum compute 316, or other components of order book system 300.

The input 308 and output 318 may be transmitted to various locations or users. The input 308 may be communicated to the quantum compute 316 and/or the order book device 302. The order book device 302 may, after determining a classification 320, transfer such data as output 318. The data included with the input may include order book data 310. The order book data 310 may include various data points, such as open buy orders and open sell orders for a particular financial security or stock for a particular time period. In an embodiment, the order book data 310 may include data related to one or more order books. In such examples, the data may relate to one or more different financial securities or stocks. In another example, the input 308 may include time series data 312. The time series data 312 may include data associated with the financial instrument or stock associated with the order book and/or additional financial instruments, stocks, and/or other order books over a selected or specified period of time. Finally, the input 308 may include market tick data 314. The market tick data 314 may include current or historical market data. In an example, the market tick data 314 may be updated continuously, substantially continuously, or periodically.

Although FIG. 3 illustrates an environment and implementation of the present disclosure in which the order book device 302 interacts with an input 308, an output 318, and quantum compute 316, in some embodiments users may directly interact with the order book system 300 or any component of the order book system 300 (e.g., via input/output circuitry of any of the components of order book system 300). Whether by way of direct interaction or via a separate interaction, a user may communicate with, operate, control, modify, or otherwise interact with the order book system 300 to perform functions described herein and/or achieve benefits as set forth in connection with this disclosure.

Figure 4:
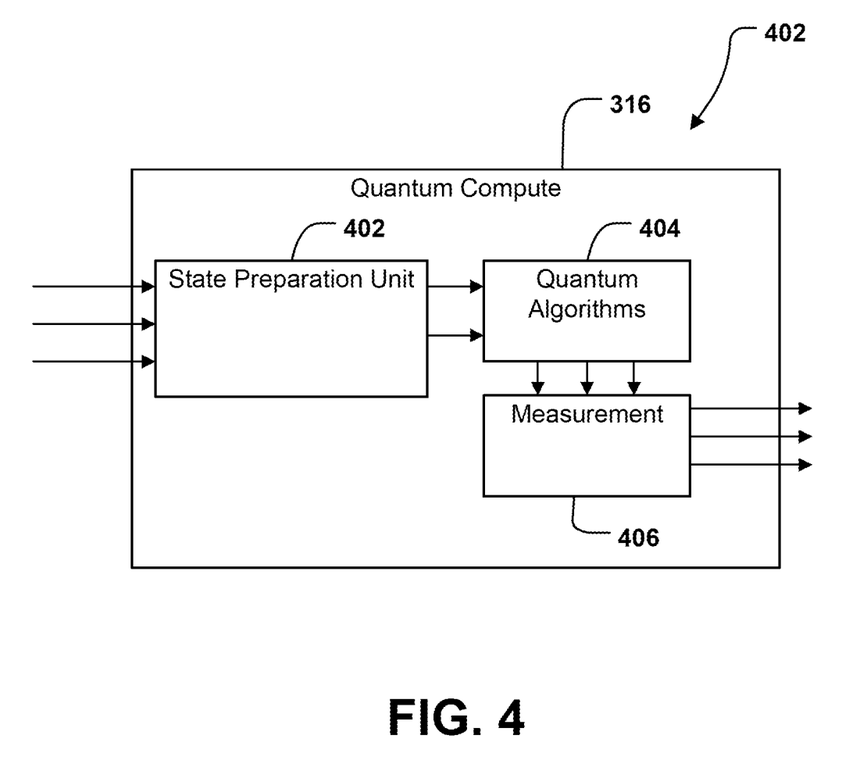
FIG. 4 illustrates a block diagram of example quantum compute that determines a value, in accordance with some example embodiments described.

As illustrated in FIG. 4, the quantum compute 316 may include a state preparation unit 402. The state preparation unit 402 may pre-process data (e.g., conversion or process to a format usable by the quantum compute 316). In an example, the state preparation unit 402 may create a quantum superposition. Moreover, the quantum compute 316 may include different quantum algorithms 404, such as algorithms to train a model or classifier or apply data to a trained model or classifier. Utilizing quantum logic gates or other quantum computing methods, quantum compute 316 may train a machine learning model or classifier or execute a trained model or classifier, e.g., using a measurement block 406, to predict the side of an order book on which market liquidity may be clustering or directionality of an order book.

Once a classifier is determined, the order book device 302, including processing circuitry 304 and memory 306, may utilize the classifier to determine an order or execution strategy based on current market tick data 314 from a market tick data source, and open buy and sell order data (e.g. order book data 310). The order book device 302 may retrieve data, e.g., market tick data and/or open buy and sell order data, via a communications network (e.g., communications network 108 shown in FIG. 1). Further, the order book device 302 (which may comprise the order book system 102 shown in FIG. 1) may communicate with the order book device 302 over the communications network.

Figure 5:
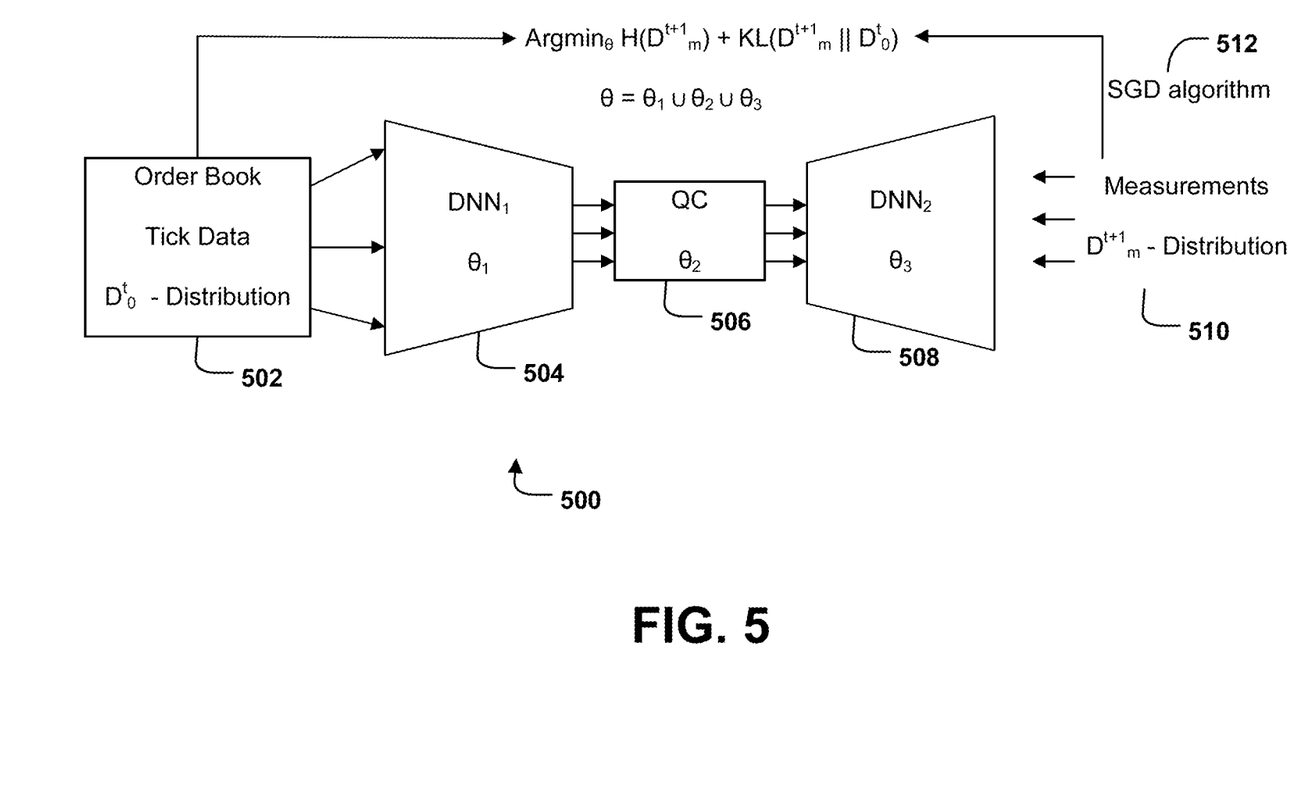
FIG. 5 illustrates another block diagram of example quantum compute that determines a classifier, in accordance with some example embodiments described herein

FIG. 5 represents an illustration representing potential functionality regarding quantum compute 500. Data 502, such as an order book, tick data, and a probability distribution or outcome for a first time period may be sent or transmitted to a first block or module 504 of the quantum compute 500. The first block or module 504 may include a deep neural network (DNN) model. Such a first block or module 504 may transfer data (e.g., vectors and/or features generated by the DNN model) to a QC module 506. The QC module 506 may assess the output of the first module 504 to ensure that the DNN model is providing proper data. The QC module 506 may send or transmit data to a second block or module 508, which may include another DNN model. Finally, the output 510 may perform iterative determinations to ensure a low error rate. Such an iterative determination may include a stochastic gradient descent algorithm 512.

Figure 6:
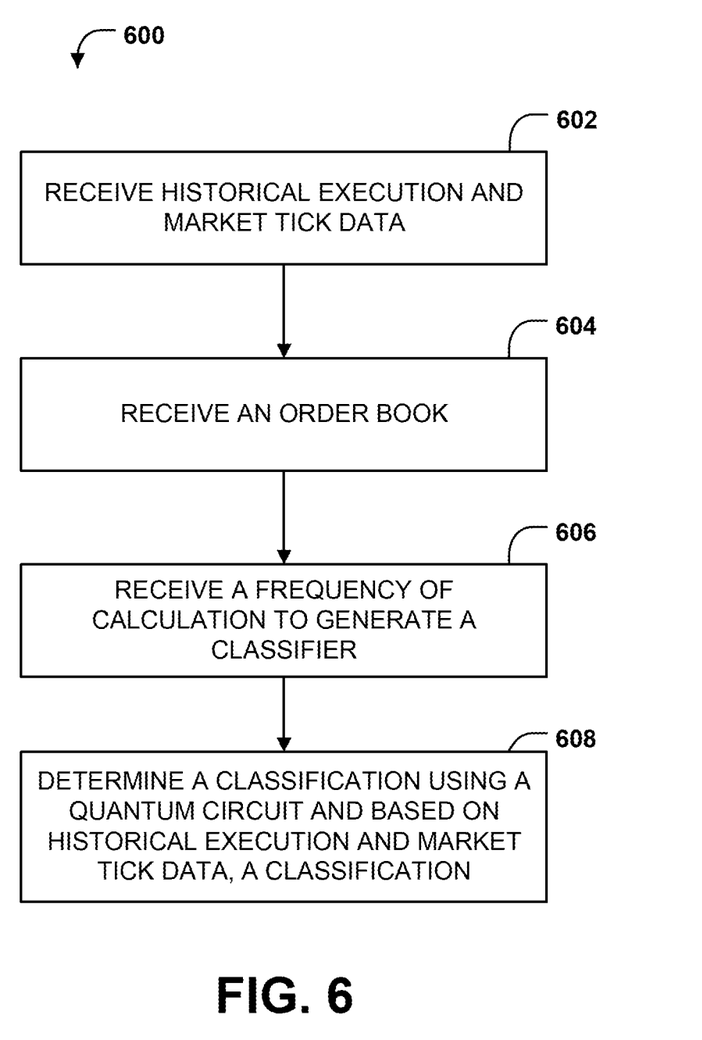
FIG. 6 illustrates an example flowchart for determining a classification, in accordance with some example embodiments described herein.
Figure 7:
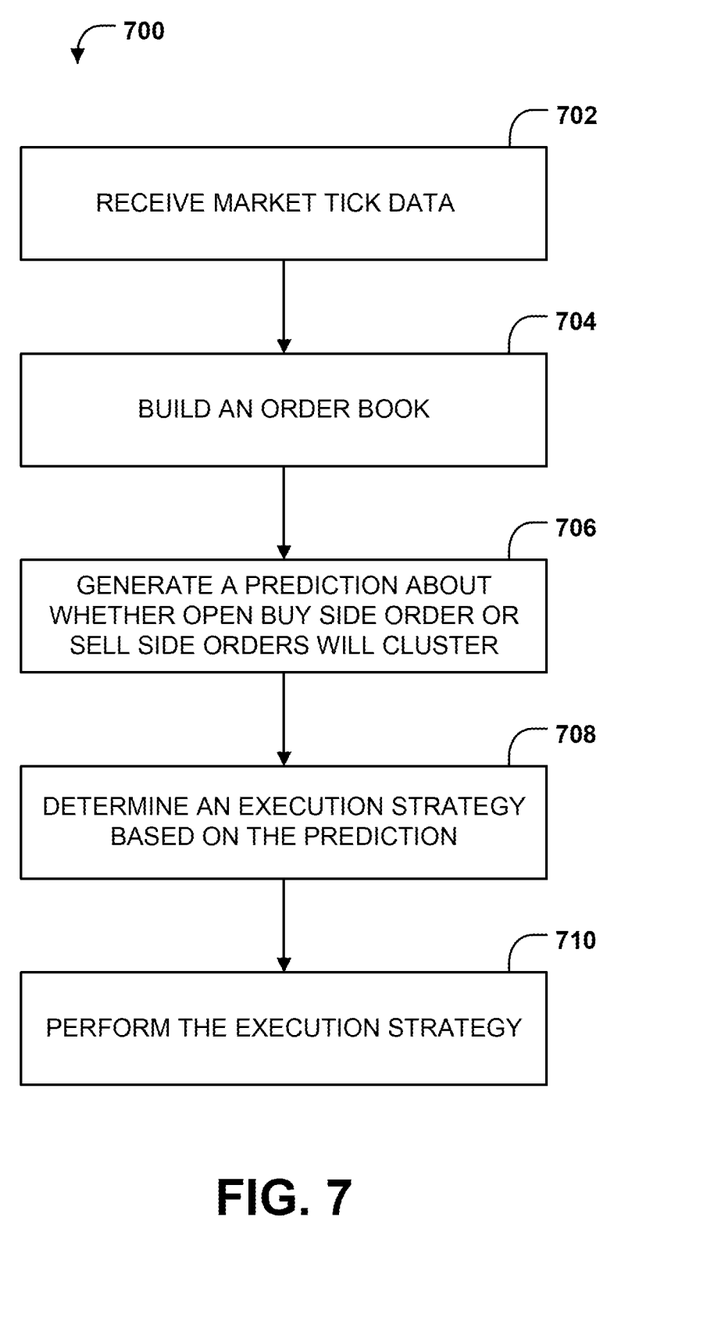
FIG. 7 illustrates an example flowchart for determining an execution strategy, in accordance with some example embodiments described herein.
Figure 8:
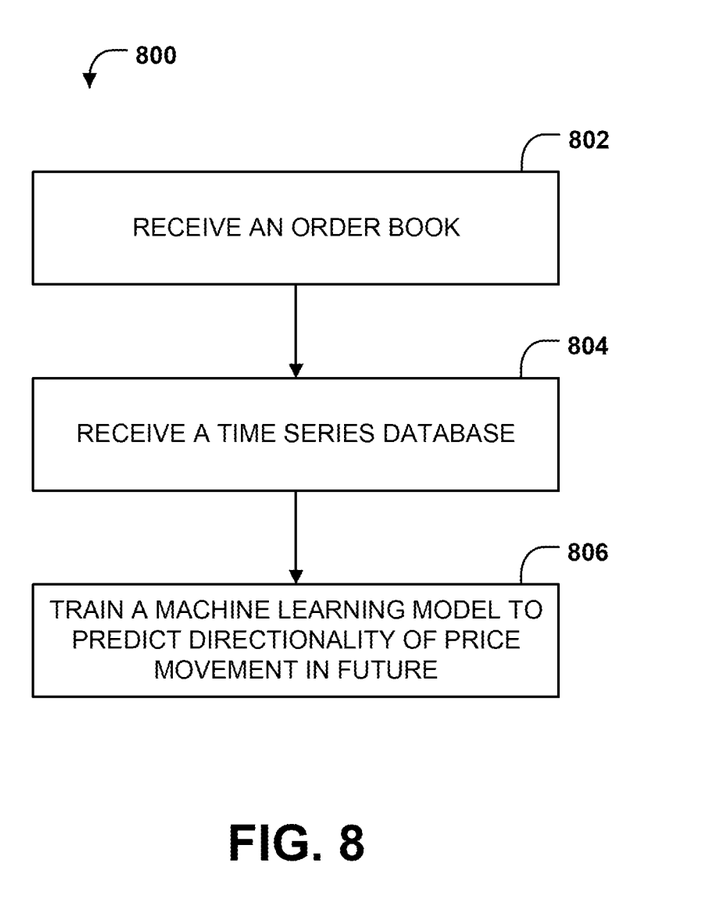
FIG. 8 illustrates an example flowchart for training a machine learning model, in accordance with some example embodiments described herein.

Turning to FIGS. 6, 7, and 8, example flowcharts are illustrated that contain example operations implemented by example embodiments described herein. The operations illustrated in FIGS. 6 through 8 may, for example, be performed by order book system 102 shown in FIG. 1 and apparatus shown in FIG. 2.

Turning first to FIG. 6, a flowchart 600 illustrates example operations for predicting the side of order book on which market liquidity is likely to cluster at a future time period.

As shown by operation 602, the order book system 102, order book circuitry 210, communications circuitry 206, and/or input-output circuitry 208 may receive data. The data may include historical execution and market tick data. The historical execution data may include buys and sells for a particular financial instrument or stock for a particular time period. The historical market tick data may include the amount by which the financial instrument or stock may tick up, down, or not all for the particular time period. Other data may be considered for the model (e.g., additional financial instruments or stocks). The data may be received from a user, from another computing device, from storage device 106, from the memory 204, or from another location.

As shown by operation 604, the order book system 102, order book circuitry 210, communications circuitry 206, and/or input-output circuitry 208 may receive additional data. The additional data may include an order book. The order book may comprise one order book for a specified or arbitrary financial instrument or stock for a particular time period.

As shown by operation 606, the order book system 102 and/or order book circuitry 210 may receive a frequency of calculation to generate the classifier. The frequency may be provided by a user via a graphical user interface. Additionally, or alternatively, the frequency may be a preset value stored in the storage device 106 of the order book system 102. The frequency of calculation may, for instance, once every second, more frequent that than (e.g., once every millisecond) or less than or equal to once every second.

As shown by operation 608, the order book system 102 and/or order book circuitry 210 may determine a classification, indicative of the side of the order book on which market liquidity is likely to cluster at a future time period. Further, a hybrid approach may be sought. In such an example, the quantum compute may determine a classification based on one type of model, while the order book system 102 or order book circuitry 210 may also determine a classification based on other types of models. The classifications from both the quantum compute 316 and order book system 102 may be averaged or utilized in a way to decrease error rate of such determinations.

Turning next to FIG. 7, a flowchart 700 illustrates another set of example operations for determining which side of order book market liquidity will cluster at a future time period.

As shown by operation 702, order book system 102, order book circuitry 210, communications circuitry 206, and/or input-output circuitry 208 may receive market tick data. The market tick data may be received by, for example, communications circuitry 206 from a market tick data source. The market tick data may be received continuously, substantially continuously, or periodically. For example, market tick data may be received every about 1 millisecond, about 1 second, up to about 1 minute, among other lesser or greater time periods or intervals.

As shown by operation 704, the order book system 102 and/or order book circuitry 210 of the computing device 302 may build an order book. The order book may be built from open buy and sell order data. The open buy and sell order data may be sent from an open buy and sell order data source. The open buy and sell order data may be received continuously, substantially continuously, or periodically. The order book may be updated as data is received.

As shown by operation 706, the order book system 102 and/or order book circuitry 210 may generate a prediction about whether the open buy side order or sell side order will cluster. The computing device may generate such a prediction based on a classification received from a classifier (that may be trained using a classical-quantum hybrid technique or using a solely quantum technique), and also based on the order book and the market tick data. In other words, the order book and the market tick data may be applied to the classifier, to provide a number, probability, prediction, outcome, trigger, or indicator indicating favorability or potential to cluster. In another embodiment, the order book and the market tick data may be applied to the classifier to provide a probability or outcome to indicate a transaction occurring at a particular price. The use of quantum compute to generate the classifier significantly decreases the amount of time to obtain a prediction or indicator, such that in some embodiments the prediction or indicator is generated substantially simultaneously (i.e., in near-real-time) with receipt of the market tick data.

As shown by operation 708, the order book system 102 and/or order book circuitry 210 may determine an execution strategy based on the prediction. As with the generation of the prediction, the execution strategy may be generated substantially simultaneously (i.e., in near-real-time) with receipt of the market tick data. The execution strategy may indicate actions to be taken by a user or the order book system 102 and/or order book circuitry 210 in regards to the order book. In an example, such determinations may occur many times during a short period of time (e.g., multiple determinations per second or minute). In such examples, the execution or order strategy may be executed by, rather than a user, the order book system 102 and/or order book circuitry 210. If order quantity is expected to cluster on the buy side, that prediction suggests that the price of the instrument will rise in the future time horizon. Alternatively, if the order quantity is expected to cluster on the sell side in the examined future time horizon, that prediction suggests that the price of the instrument will fall in the future time horizon. In either case, the prediction is that the future price of the instrument will change. In other embodiments, the prediction is based on a particular price that a transaction on either side may occur at. Based on this information, it may make sense to employ a spread crossing/take execution strategy in anticipation of the predicted change in the price of the instrument. Where clustering is not expected, however, the spread capture execution tactic may utilize a passive/midpoint quoting combination cycle.

Finally, as shown by operation 710, the order book system 102 and/or order book circuitry 210 may perform the execution strategy. In another example, a user may perform the execution strategy or prompt performance of the execution strategy. Another computing device may also perform the execution strategy.

Turning next to FIG. 8, a flowchart 800 illustrates example operations for predicting a probability or outcome of directionality of price movement in a future time horizon.

As shown by operation 802, the order book system 102 and/or order book circuitry 210 may receive an order book. The order book may be stored locally or remotely. The order book may include historical data. The order book may be sent or transmitted from a user.

As shown by operation 804, the order book system 102 and/or order book circuitry 210 may receive a time series database or data. The time series database or data may include a number of transactions over a series of time. The number of transactions may be large (e.g., in the thousand or in the millions). The time-series database may be associated with the financial instrument or stock associated with the order book and/or additional financial instruments, stocks, and/or other order books.

As shown by operation 806, the order book system 102 and/or order book circuitry 210 may train a machine learning model or classifier. The trained machine learning model or classifier may predict or generate a probability or outcome indicating directionality of price movement in the future or at a future time period or interval, and this prediction may comprise a binary classification or a multi-class classification. The future time period or interval may be about 15 seconds or less, about 30 seconds, about 45 seconds, about 1 minute, or greater than 1 minute. The machine learning model may comprise a recurrent neural network or another type of model.

As described above, example embodiments provide methods and apparatuses that enable improved predictions to determine which side of order book market liquidity is likely to cluster. Example embodiments thus provide tools that overcome the problems faced by classical type machine learning algorithms. By utilizing quantum compute, the speed to determine such predictions may be significantly decreased and provide a much lower error rate when compared to similar operations being performed using classical compute. Moreover, embodiments described herein avoid the use of sole classical computing machine learning, which requires more data to reduce error and thus a larger amount of time to obtain the classification.

As these examples all illustrate, such example embodiments contemplated herein provide technical solutions that solve real-world problems. While volatile markets have been an issue for decades, the recent market volatility, in addition to substantially increased rates of transactions, today has made this problem significantly more acute, as the demand for investing, via retail investors and larger traditional institutions, has grown significantly even during the increasing market volatility. At the same time, the recently arising ubiquity of quantum computing has unlocked new avenues to solving this problem that historically were not available, and example embodiments described herein thus represent a technical solution to these real-world problems.

FIGS. 6, 7, and 8 illustrate flowcharts describing sets of operations performed by apparatuses, methods, and computer program products according to various example embodiments. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for determining which side of order book market liquidity will cluster at a future time period, the method comprising:
   receiving, substantially continuously and by an order book circuitry, market tick data;
   building, by the order book circuitry, an order book including open buy side orders and open sell side orders; and
   in response to reception of the market tick data:
      generating, substantially simultaneously with receipt of the market tick data and by the order book circuitry and a trained model, an outcome indicating whether the open buy side orders or the open sell side orders will cluster, the trained model being trained using at least in part a quantum circuit with historical execution and market tick data,
      determining, substantially simultaneously with receipt of the market tick data and by the order book circuitry, an execution strategy based on the outcome, wherein the execution strategy indicates actions to be taken in an instance in which the open buy side orders cluster and actions to be taken in an instance in which the open sell side orders will cluster, and
      performing, by the order book circuitry, the execution strategy in relation to the open buy side orders or the open sell side orders.

2. The method of claim 1, wherein the order book circuitry uses a combination of a classical computer and a quantum computer to generate the outcome by the trained model.

3. The method of claim 1, further comprising:
   receiving, by the order book circuitry, time series data; and
   generating, by the order book circuitry and at least in part using the quantum circuit, a probability of directionality of price movement in a future time horizon based on the order book and the time series data.

4. The method of claim 1, wherein the trained model is trained using one or more of a quantum computer or a classical computer.

5. The method of claim 4, wherein the trained model comprises one of a Quantum Bayesian, extreme gradient boosted trees, or a recurrent neural network.

6. The method of claim 1, further comprising:
   receiving a frequency of calculation to generate a classification; and
   determining, at least in part using the quantum circuit and based on the historical execution and market tick data, the classification for the future time period identifying which side of the order book is likely to cluster.

7. The method of claim 6, wherein the determining the classification occurs based on the frequency of classification.

8. The method of claim 6, wherein the trained model is trained to predict the probability of directionality of price movement in the future time horizon using multi-class classification.

9. The method of claim 6, wherein the frequency of calculation is less than or equal to once every second.

10. The method of claim 1, wherein the outcome and the execution strategy are generated and determined, respectively, about once each millisecond to about once each second.

11. The method of claim 1, wherein a plurality of outcomes is generated based on substantially continuously updated market tick data.

12. The method of claim 11, wherein the execution strategy is based on the plurality of outcomes generated over a selected period of time.

13. An apparatus for predicting an outcome of directionality of price movement in a future time horizon, the apparatus comprising:
an order book circuitry configured to:
receive, substantially continuously, market tick data;
build an order book including open buy side orders and open sell side orders; and
in response to reception of market tick data:
generate, substantially simultaneously with receipt of the market tick data and using a trained model, an outcome indicating whether the open buy side orders or the open sell side orders will cluster, the trained model being trained using at least in part a quantum circuit with historical execution and market tick data,
determine, substantially simultaneously with receipt of the market tick data, an execution strategy based on the outcome, wherein the execution strategy indicates actions to be taken in an instance in which the open buy side orders cluster and actions to be taken in an instance in which the open sell side orders will cluster, and
perform the execution strategy in relation to the open buy side orders or the open sell side orders.

14. The apparatus of claim 13, wherein the order book includes historical buy side orders and open sell side orders.

15. The apparatus of claim 13, wherein the outcome is based on a price that a transaction may occur.

16. The apparatus of claim 13, wherein the order book circuitry is further configured to:
receive time series data; and
generate, at least in part using the quantum circuit, a probability of directionality of price movement in a future time horizon based on the order book and the time series data.

17. The apparatus of claim 13, wherein the order book circuitry is further configured to:
receive a frequency of calculation to generate a classification; and
determine, at least in part using the quantum circuit and based on the historical execution and market tick data, the classification for the future time period identifying which side of the order book is likely to cluster.

18. A computer program product for predicting an outcome of directionality of price movement in a future time horizon, the computer program product comprising at least one non-transitory computer-readable storage medium storing software instructions that, when executed, cause an apparatus to:
receive, substantially continuously, market tick data;
build an order book including open buy side orders and open sell side orders; and
in response to reception of market tick data:
generate, substantially simultaneously with receipt of the market tick data and using a trained model of the apparatus, an outcome indicating whether the open buy side orders or the open sell side orders will cluster, the trained model being trained using at least in part a quantum circuit with historical execution and market tick data,
determine, substantially simultaneously with receipt of the market tick data, an execution strategy based on the outcome, wherein the execution strategy indicates actions to be taken in an instance in which the open buy side orders cluster and actions to be taken in an instance in which the open sell side orders will cluster, and
perform the execution strategy in relation to the open buy side orders or the open sell side orders.

19. The computer program product of claim 18, wherein the trained model comprises one or more of a quantum computer based model or classical computer based model.

20. The computer program product of claim 18, wherein the trained model is further refined based on the generated outcome, the determined execution strategy, and actual buy side orders and sell side orders.

* * * * *